United States Patent
Okada et al.

(10) Patent No.: US 8,857,890 B2
(45) Date of Patent: Oct. 14, 2014

(54) DRIVING APPARATUS FOR OPENING AND CLOSING BODY FOR VEHICLE

(75) Inventors: Mitsuhiro Okada, Kiryu (JP); Ryuichi Nakajima, Kiryu (JP); Tatsuyuki Saito, Kiryu (JP); Zentaro Yamaguchi, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 76 days.

(21) Appl. No.: 13/702,326

(22) PCT Filed: Jun. 3, 2011

(86) PCT No.: PCT/JP2011/062793
§ 371 (c)(1),
(2), (4) Date: Mar. 13, 2013

(87) PCT Pub. No.: WO2011/155405
PCT Pub. Date: Dec. 15, 2011

(65) Prior Publication Data
US 2013/0160581 A1    Jun. 27, 2013

(30) Foreign Application Priority Data
Jun. 7, 2010  (JP) .................................. 2010-129533

(51) Int. Cl.
*B60J 5/04*    (2006.01)
(Continued)

(52) U.S. Cl.
CPC ............ *B60J 5/047* (2013.01); *E05Y 2900/531* (2013.01); *H02K 7/116* (2013.01); *H02K 5/24* (2013.01); *H02K 1/2733* (2013.01); *E05F 15/146* (2013.01); *H02K 1/30* (2013.01); *E05F 15/145* (2013.01); *H02K 7/1004* (2013.01)
USPC ..................................................... 296/146.4

(58) Field of Classification Search
CPC ....................................................... B60J 5/047
USPC ........... 296/146.1, 155, 146.4, 146.9; 74/425, 74/89.2, 89.22; 49/279, 280, 281; 292/DIG. 23
See application file for complete search history.

(56) References Cited

U.S. PATENT DOCUMENTS 2,045,765 A * 6/1936 Fogal ............................ 160/108
4,337,596 A * 7/1982 Kern et al. ....................... 49/210

(Continued)

FOREIGN PATENT DOCUMENTS

FR    2603647 A * 3/1988
JP    2001-294044 A    10/2001
(Continued)

OTHER PUBLICATIONS

PCT Search Report for PCT Serial No. PCT/JP2011/062793 dated Aug. 29, 2011.

*Primary Examiner* — H Gutman
(74) *Attorney, Agent, or Firm* — McCormick, Paulding & Huber LLP

(57) ABSTRACT

A hypocycloid reducer 70 for reducing rotation of a flat motor 60 to output the speed-reduced rotation to a drum is provided between the drum and the flat motor 60, a rotor shalt member 65 which is rotated with the same rotation number as the flat motor 60 is axially aligned with the drum is provided on the same side as the flat motor 60. An output rotation body 74 for outputting the speed-reduced rotation is axially aligned with the drum and provided on the same side as the drum. Since the rotor shaft member 65 and the output rotation body 74 are axially aligned with the drum, turning force can be transmitted bi-directionally between the rotor shaft member 65 and the output rotation body 74. Therefore, it is possible to eliminate an electromagnetic clutch to reduce the driving apparatus in size and weight, and since wires and control logic of the electromagnetic clutch are not needed for the driving apparatus, the driving apparatus can be reduced in production cost.

10 Claims, 10 Drawing Sheets

(51) Int. Cl.
*H02K 7/116* (2006.01)
*E05F 15/14* (2006.01)
*H02K 1/30* (2006.01)
*H02K 7/10* (2006.01)
*H02K 5/24* (2006.01)
*H02K 1/27* (2006.01)

(56) References Cited

U.S. PATENT DOCUMENTS

| | | | | |
|---|---|---|---|---|
| 4,406,420 A | * | 9/1983 | Villano | 242/388.6 |
| 4,410,844 A | * | 10/1983 | Plenzler | 318/280 |
| 4,640,050 A | * | 2/1987 | Yamagishi et al. | 49/280 |
| 5,076,016 A | * | 12/1991 | Adams et al. | 49/360 |
| 7,575,270 B2 | * | 8/2009 | Nagai et al. | 296/155 |
| 2001/0013714 A1 | | 8/2001 | Ochiai et al. | |
| 2008/0000161 A1 | | 1/2008 | Nagai et al. | |
| 2009/0107048 A1 | * | 4/2009 | Nagai et al. | 49/280 |

FOREIGN PATENT DOCUMENTS

| | | | |
|---|---|---|---|
| JP | 2003-74255 A | | 3/2003 |
| JP | 2008-25290 A | | 2/2008 |
| JP | 2010-1010 A | | 1/2010 |
| JP | 2010024724 A | * | 2/2010 |

* cited by examiner

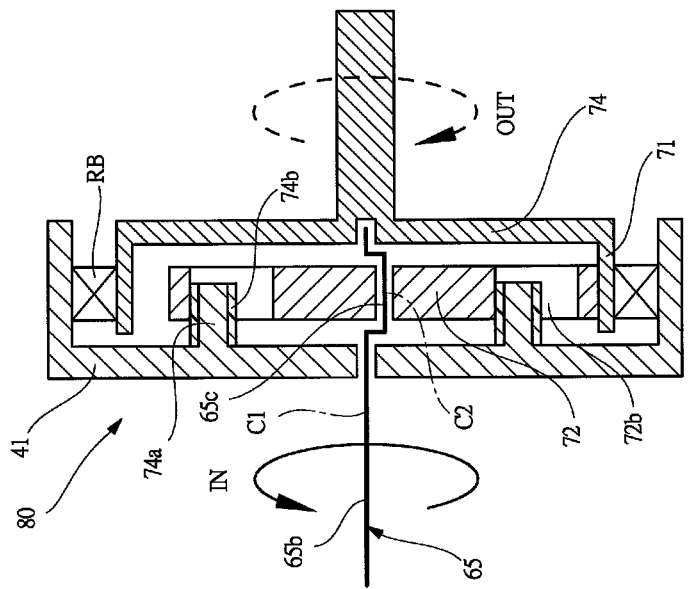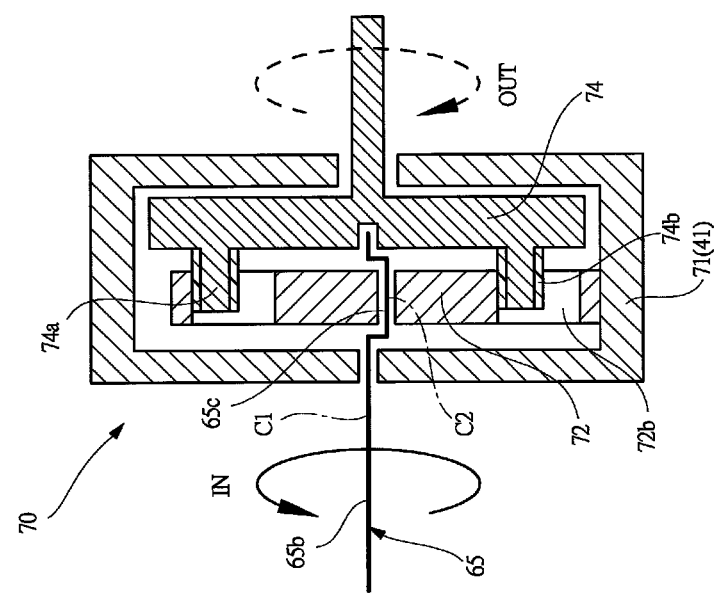

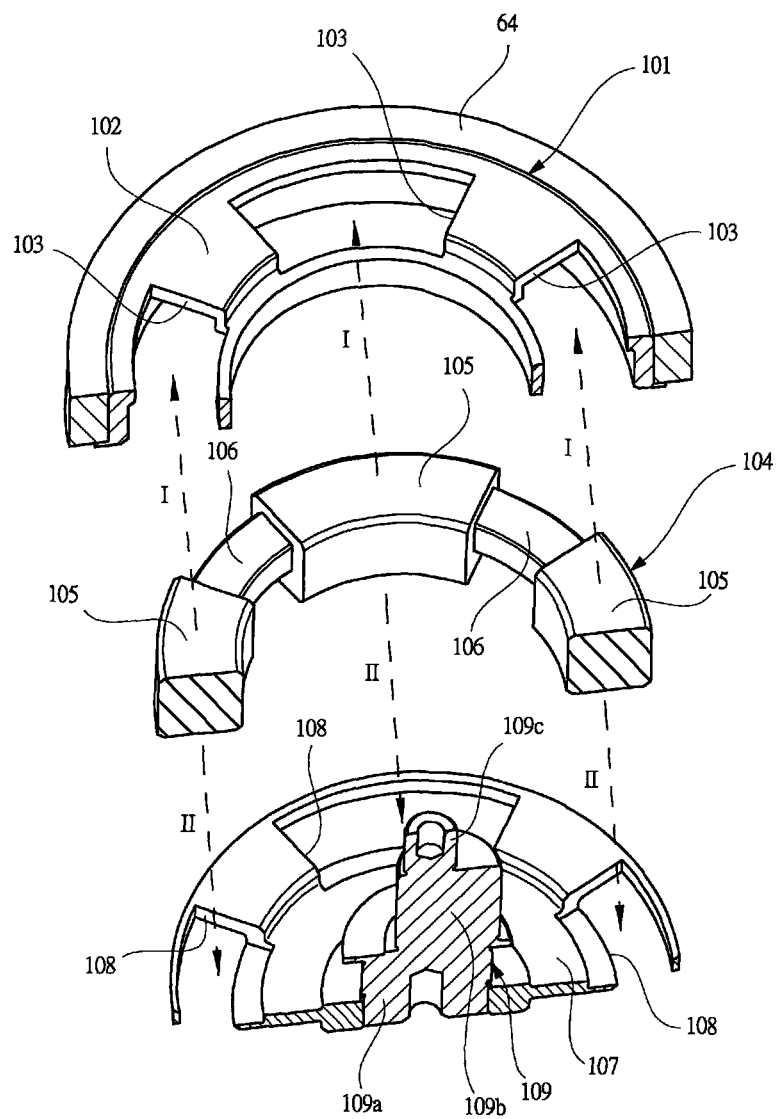

DRIVING APPARATUS FOR OPENING AND CLOSING BODY FOR VEHICLE

CROSS REFERENCE TO RELATED APPLICATIONS

This application is entitled to the benefit of and incorporates by reference essential subject matter disclosed in International Patent Application No. PCT/JP2011/062793 filed on Jun. 3, 2011 and Japanese Patent Application No. 2010-129533 filed Jun. 7, 2010.

TECHNICAL FIELD

The present invention relates to a driving apparatus for driving an opening and closing body provided to a vehicle body to open and close the opening and closing body.

BACKGROUND ART

Conventionally, in a vehicle such as a station wagon and a minivan, a side portion of its body is provided with a sliding door (i.e., opening and closing body) which is opened and closed in vehicle-front and vehicle-back directions, thereby allowing passengers or baggage to be easily loaded or unloaded from the vehicle. This sliding door can normally be opened and closed by manual operation. However, in recent years, a driving apparatus is provided in the vicinity of a slide door in many vehicles so as to automatically open and close the slide door.

As a driving apparatus for opening and closing a slide door, so-called "cable-type driving apparatus" is known, and this driving apparatus is configured to pull a cable connected to a slide door in front and rear directions of a vehicle via two pulleys which are provided at respective ends of a guide rail for guiding the slide door. The cable is wound on a drum rotatably provided in a vehicle body, and a winding direction of the cable on the drum is switched by causing the electric motor to driving the drum so as to rotate the drum in a foreword direction or in a reverse direction, so that the slide door is opened or closed.

As this cable-type driving apparatus, for example, a driving apparatus described in Japanese Patent Application Laid-Open Publication No. 2008-025290 is known. The driving apparatus (automatic opening and closing apparatus for vehicle) described in Japanese Patent Application Laid-Open Publication No. 2008-025290 is provided with: a worm wheel forming a reduction mechanism; and an electromagnetic clutch for performing switching between a manual opening and closing operation and an automatic opening and closing operation of a slide door are provided to be coaxial with the drum. The reduction mechanism is composed of the worm wheel and a worm meshing with the worm wheel, and rotation shafts of the worm wheel and the worm are perpendicular to each other.

The electromagnetic clutch is configured to couple the worm wheel with the drum, and to separate them from each other, and turning force of the worm is transmitted to the drum via the worm wheel in the coupled state, that is, the slide door can be opened and closed automatically. On the other hand, in the separated state, the drum can be freely rotated without being restricted by the worm wheel, so that the slide door can be opened and closed manually.

Thus, since the driving apparatus described in Japanese Patent Application Laid-Open Publication No. 2008-025290 is provided with a worm and a worm wheel (reduction mechanism), and they have respective rotation shafts perpendicular to each other, the turning force of the worm wheel cannot be transmitted to the worm. Therefore, the driving apparatus described in Japanese Patent Application Laid-Open Publication No. 2008-025290 is provided with an electromagnetic clutch for performing switching between the manual opening and closing operation and the automatic opening and closing operation.

SUMMARY OF THE INVENTION

So, since the driving apparatus for opening and closing the slide door is mounted in the vicinity of the slide door of the vehicle body or inside the slide door, it is desirable to further reduce the driving apparatus in size and weight, thereby sufficiently securing the degree of freedom of design on a vehicle side while improving mountability of the driving apparatus to a small-sized vehicle such as a light vehicle. However, in the driving apparatus described in the Patent Document 1, the electromagnetic clutch for performing switching between the manual opening and closing operation and the automatic opening and closing operation is provided to be axially aligned with the drum. Accordingly, there are limitations in size reduction and weight reduction of the driving apparatus. Furthermore, since wires and control logic clutch are needed for driving the electromagnetic, there is also a limitation in cost reduction of the driving apparatus.

An object of the present invention is to provide a driving apparatus for an opening and closing body for vehicle, in which the electromagnetic clutch for performing switching between the manual opening and closing operation and the automatic opening and closing operation is eliminated, and size reduction and weight reduction or cost reduction of the driving apparatus can be realized.

A driving apparatus for an opening and closing body for vehicle according to the present invention, for driving an opening and closing body provided to a vehicle body to open and close the opening and closing body, the driving apparatus comprising: a drum rotatably provided to one of the vehicle body and the opening and closing body, a wire member whose one end is wound on the drum, and whose the other end is connected to the other of the vehicle body and the opening and closing body; an electric motor for driving the drum so as to rotate the drum; a differential reducer provided between the drum and the electric motor, the differential reducer reducing the rotation of the electric motor to output the speed-reduced rotation to the drum; an input member axially aligned with the drum, and provided on the same side of the differential reducer as the electric motor, the input member being rotated by the electric motor with the same rotation number as the electric motor; and an output member axially aligned with the drum, and provided on the same side of the differential reducer as the drum, the output member outputting the speed-reduced rotation to the drum.

In the driving apparatus for the opening and closing body for vehicle according to the present invention, the differential reducer is a hypocycloid reducer which comprises an outer gear having an inner circumference having a teeth portion, and an inner gear having an outer circumference having a teeth portion, and the inner gear rolls within the outer gear while their teeth portions are held in meshing engagement with each other.

In the driving apparatus for the opening and closing body for vehicle according to the present invention, the driving apparatus has a drum unit formed by housing the drum in a drum case, and a motor unit formed by housing the electric motor and the differential reducer in a motor case, and the drum unit and the motor unit are coupled to each other so that power is transmitted between the drum unit and the motor unit.

In the driving apparatus for the opening and closing body for vehicle according to the present invention, an elastically-deformable damper member is provided between the drum and the output member, so that turning force of the output member is transmitted to the drum via the damper member.

In the driving apparatus for the opening and closing body for vehicle according to the present invention, an elastically-deformable damper member is provided between a rotor of the electric motor and the input member, so that turning force of the rotor is transmitted to the input member via the damper member.

In the driving apparatus for the opening and closing body for vehicle according to the present invention, the electric motor is composed of a flat motor, and an axial size thereof is smaller than a diametrical size thereof, and the flat motor is axially aligned with the drum.

In a driving apparatus for an opening and closing body for vehicle according to the present invention, a differential reducer for reducing the rotation of the electric motor to output the speed-reduced rotation to the drum is provided between the drum and the electric motor, an input member is axially aligned with the drum, and provided on the same side of the differential reducer as the electric motor, the input member being rotated by the electric motor with the same rotation number as the electric motor, and an output member is axially aligned with the drum, and provided on the same side of the differential reducer as the drum, the output member outputting the speed-reduced rotation to the drum. Therefore, the input member and the output member can be provided on the same axis, and turning force can be transmitted bi-directionally between the input member and the output member. Then, an electromagnetic clutch needed in the conventional driving apparatus can be eliminated; as a result, the driving apparatus can be reduced in size and weight, and enhanced in vehicle mountability. Furthermore, since the electromagnetic clutch can be eliminated, wires and control logic to be connected to the electromagnetic clutch can be simplified, so that significant cost reduction of the driving apparatus can be realized.

In the driving apparatus for the opening and closing body for vehicle according to the present invention, since the differential reducer is a hypocycloid reducer which comprises an outer gear having an inner circumference having a teeth portion, and an inner gear having an outer circumference having a teeth portion, and the inner gear rolls within the outer gear while their teeth portions are held in meshing engagement with each other, the differential reducer can be composed of two members, that is, the outer gear and the inner gear, so that high efficiency of power transmission can be achieved. Furthermore, since the axial size of the differential reducer can be kept within the thickness size of the outer gear or the inner gear, the size reduction of the driving apparatus can be achieved by suppressing the thickness size of the driving apparatus.

In the driving apparatus for the opening and closing body for vehicle according to the present invention, since the driving apparatus has a drum unit formed by housing the drum in a drum case, and a motor unit formed by housing the electric motor and the differential reducer in a motor case, and the drum unit and the motor unit are coupled to each other so that power is transmitted between the drum unit and the motor unit. Accordingly, for example, by preparing a plurality of motor units different from one another in specification (a reduction ratio of the differential reducer, a rated output of the electric motor, or the like), it is possible to apply the driving apparatus to various vehicles (different in weight of slide door or the like) by replacing only a motor unit. Furthermore, since the drum unit and the motor unit can be detached from each other, their units can be maintained easily.

In the driving apparatus for the opening and closing body for vehicle according to the present invention, since an elastically-deformable damper member is provided between the drum and the output member, so that turning force of the output member is transmitted to the drum via the damper member, it is possible to suppress noises due to play between the output member and the drum by suppressing the play. Furthermore, shaft deviation between the output member and the drum can be absorbed by elastic deformation of the damper member, and for example, even if the drum is inclined at the time of winding a cable on it, transmission of turning force can be performed smoothly while suppressing play between the output member and the drum.

In the driving apparatus for the opening and closing body for vehicle according to the present invention, since an elastically-deformable damper member is provided between a rotor of the electric motor and the input member, so that turning force of the rotor is transmitted to the input member via the damper member, it is possible to suppress noises due to play between the rotor and the input member by suppressing the play. Furthermore, since operating force for the opening and closing body is transmitted to the rotor from the drum via the differential reducer, the operating force is increased in speed to be changed to small force in the differential reducer, and the small force is loaded to the damper member, so that an impact occurring at the time of manually operating the opening and closing body can be received by a small damper efficiently, and the driving apparatus can be reduced in size.

In a driving apparatus for the opening and closing body for vehicle according to the present invention, since the electric motor is composed of a flat motor, wherein an axial size thereof is smaller than a diametrical size thereof, and the flat motor is axially aligned with the drum, it is possible to suppress the increase in size (thickness) of the driving apparatus in the axial direction of the drum. Therefore, the driving apparatus can be improved in vehicle mountability by thinning (flattening) the driving apparatus. Furthermore, since the drum, the differential reducer, and the electric motor are provided on the same axis, turning force can be transmitted efficiently from the input member to the output member and from the output member to the input member.

BRIEF DESCRIPTION OF THE DRAWINGS

FIG. 8A is an operation explaining view of an hypocycloid reducer of this embodiment;

FIG. 8B is an operation explaining view of another hypocycloid reducer (modification);

FIG. 10 is an exploded perspective view for explaining a connecting structure of a rotor, a damper member, and an input member in the motor unit.

BEST MODE FOR CARRYING OUT THE INVENTION

Hereinafter, the first embodiment of the present invention will be described in detail with reference to the drawings.

Figure 1:
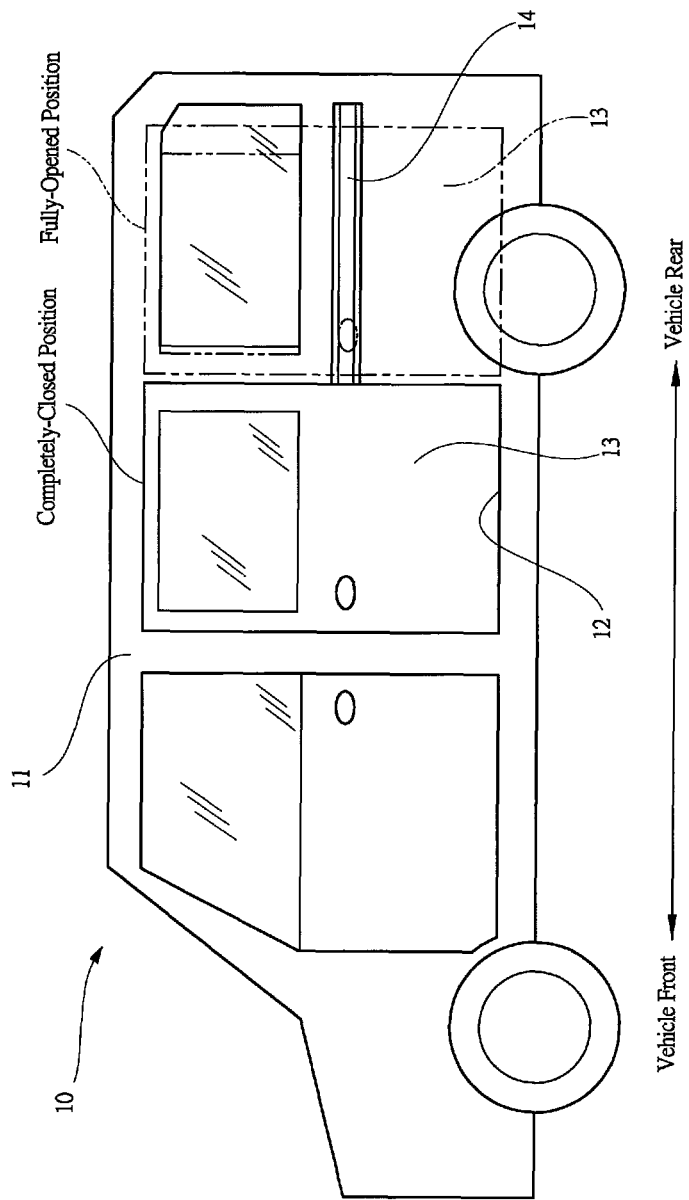
FIG. 1 is a side view showing a vehicle mounted with a driving apparatus according to the present invention.
Figure 2:
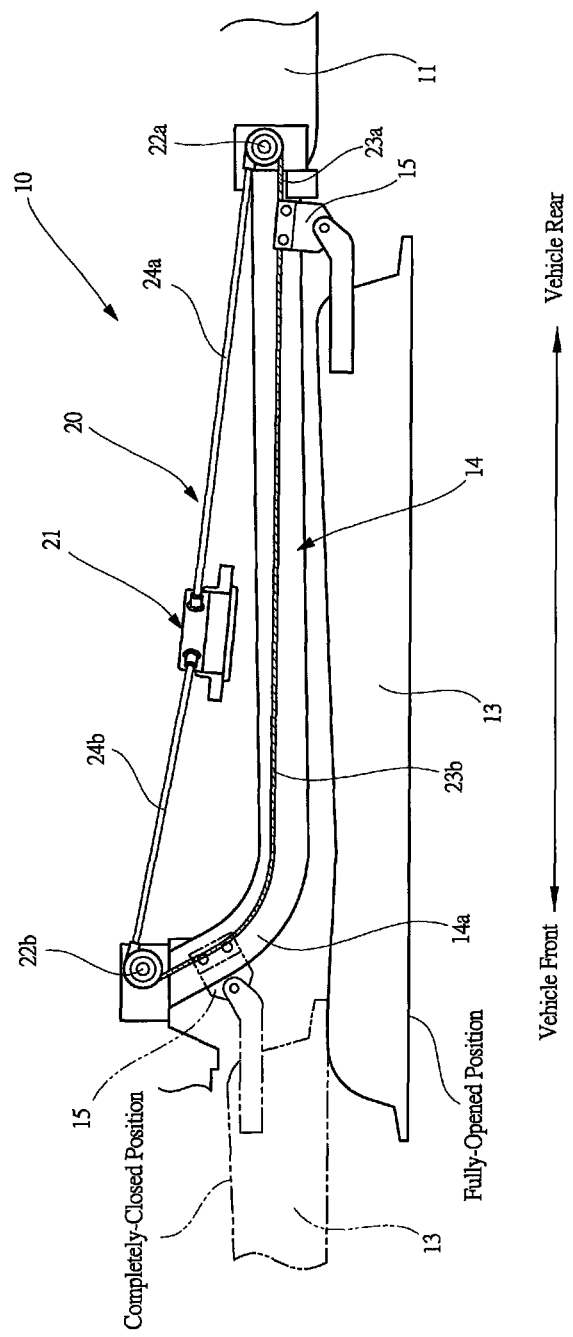
FIG. 2 is a plan view showing an attaching structure of a slide door.
Figure 3:
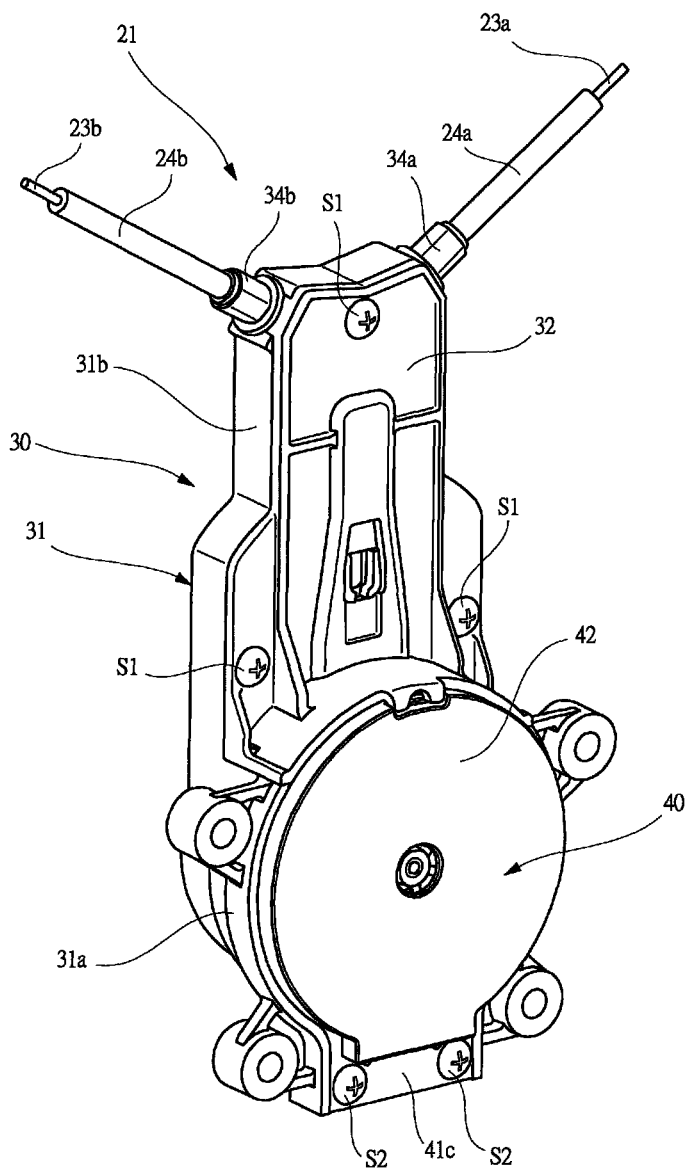
FIG. 3 is a perspective view showing an exterior appearance of the driving apparatus.
Figure 4:
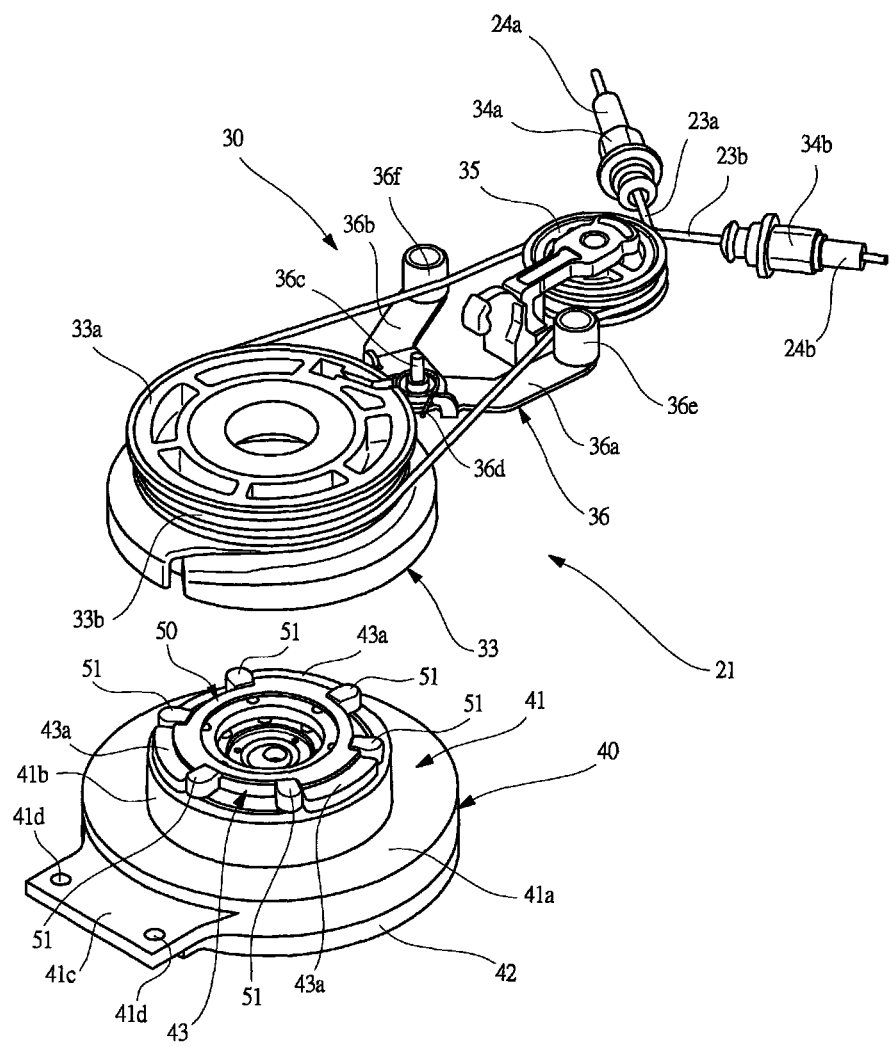
FIG. 4 is a perspective view showing a drum unit and a motor unit.
Figure 5:
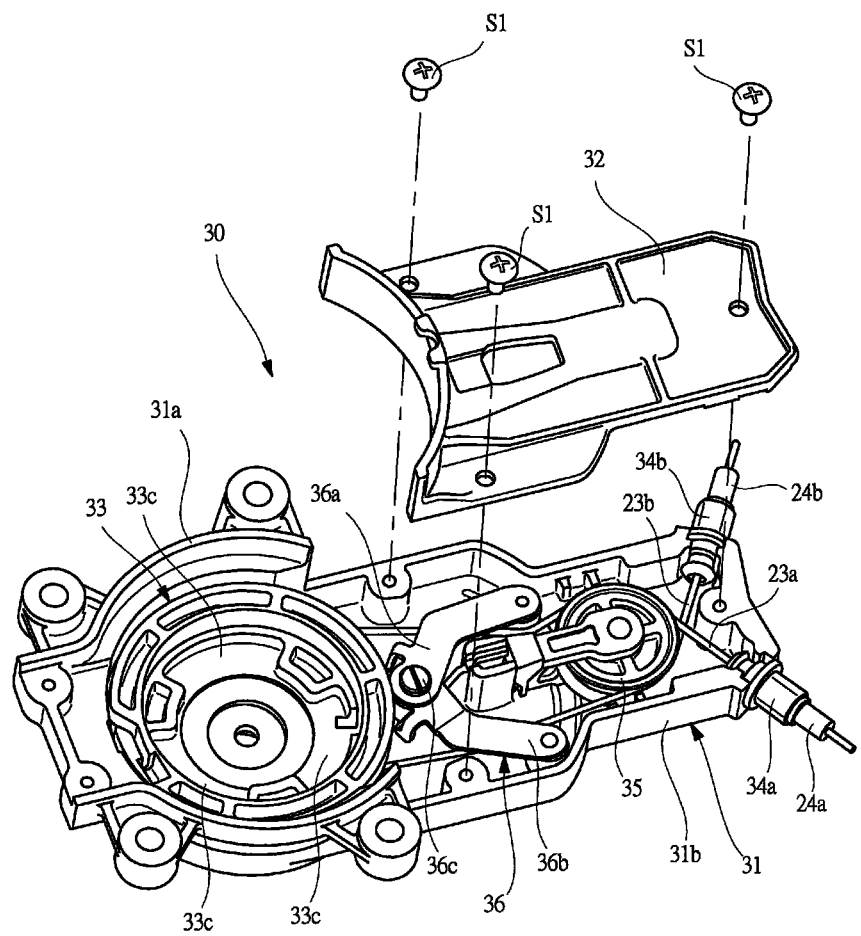
FIG. 5 is an exploded perspective view for explaining a detailed structure of a drum unit.
Figure 6:
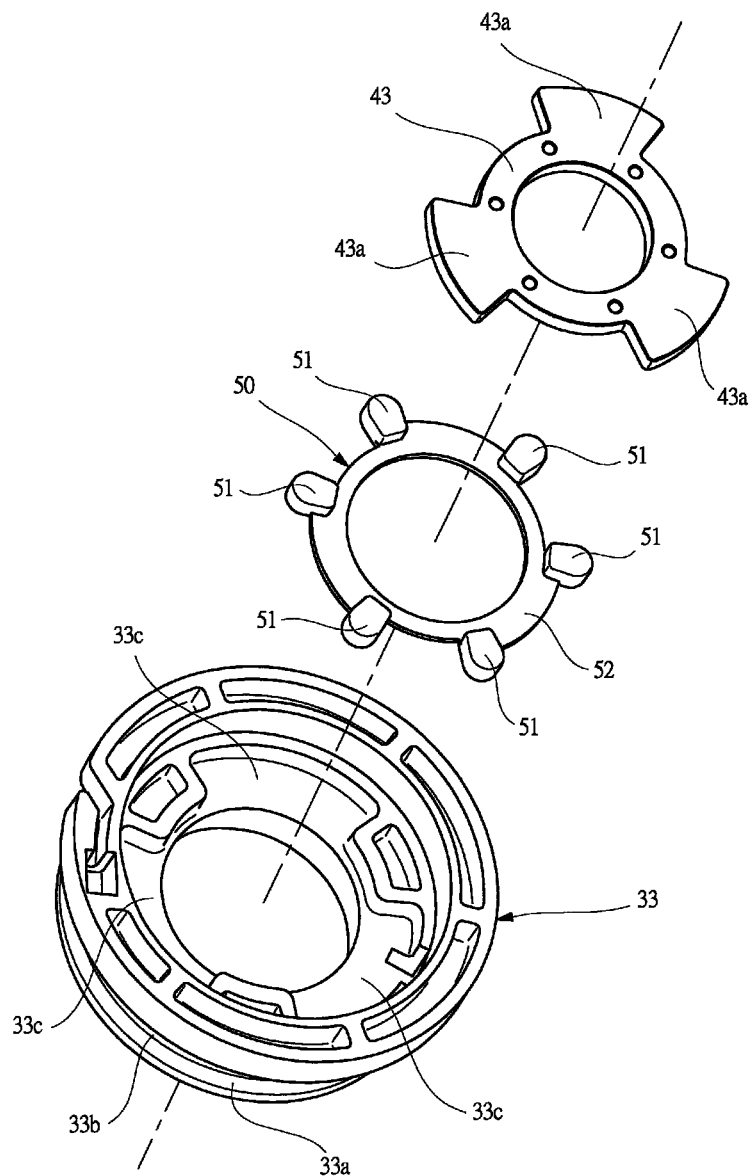
FIG. 6 is an exploded perspective view for explaining a connecting structure of a drum, a damper member, and a torque transmitting member.
Figure 7:
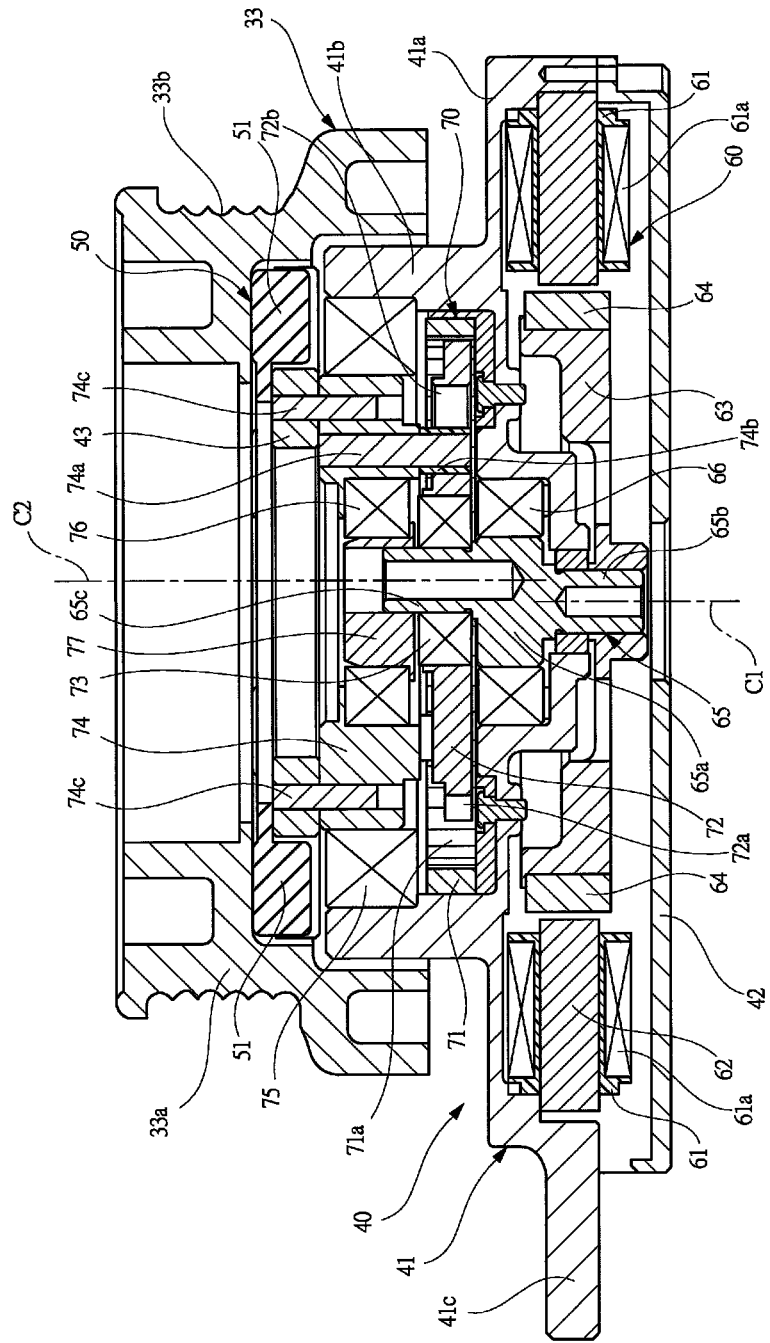
FIG. 7 is a cross sectional view showing a detailed structure of a motor unit.

FIG. 1 is a side view showing a vehicle mounted with a driving apparatus according to the present invention, FIG. 2 is a plan view showing an attaching structure of a slide door, FIG. 3 is a perspective view showing an exterior appearance of the driving apparatus, FIG. 4 is a perspective view showing a drum unit and a motor unit, FIG. 5 is an exploded perspective view for explaining a detailed structure of a drum unit, FIG. 6 is an exploded perspective view for explaining a connecting structure of a drum, a damper member, and a torque transmitting member, FIG. 7 is a cross sectional view showing a detailed structure of a motor unit, FIG. 8A is an operation explaining view of an hypocycloid reducer of this embodiment, and FIG. 8B is an operation explaining view of another hypocycloid reducer (modification).

A vehicle 10 shown in FIG. 1 is, for example, an eight-seater station wagon, and a side portion of a vehicle body 11 of the vehicle 10 is formed with a relatively large opening portion 12. The opening portion 12 is opened and closed by a slide door (opening and closing body) 13, and the slide door 13 is guided by a guide rail 14 fixed to the side portion of the vehicle body 11, so that the slide door 13 is slid between a completely-closed position and a fully-opened position in a front direction and a rear direction of the vehicle 10. The opening portion 12 is opened by operator's sliding operation of the slide door 13 toward the fully-opened position, thereby allowing passengers or baggage to be easily loaded or unloaded from the vehicle.

As shown in FIG. 2, a roller assembly 15 is provided on the vehicle rear side of the slide door 13 at a vertically-central portion of the slide door 13. The roller assembly 15 is guided by the guide rail 14 so that the slide door 13 is moved along the side portion of the vehicle body 11 in forward and rearward directions of the vehicle 10. A curved portion 14a curved on the vehicle interior side (an upper side in FIG. 2) is provided on the vehicle front side of the guide rail 14, and when the roller assembly 15 is guided to the curved portion 14a, the slide door 13 is drawn in an inward direction of the vehicle body 11 so as to be substantially flush with a side face of the vehicle body 11 to reach the fully-closed position, as shown by a two-dot chain line in FIG. 2.

Here, in addition to the roller assembly 15 provided at the center portion of the slide door 13 in the vertical direction, roller assemblies (not shown) are respectively provided on the vehicle front side of the slide door 13 at a vertically-upper portion and a vertically-lower portion. Furthermore, guide rails (not shown) are also provided at vertically-upper portion and vertically-lower portion of the opening 12 of the vehicle body 11 so as to correspond to the roller assemblies provided at the vertically-upper and vertically-lower portions. Thus, the slide door 13 is supported with respect to the vehicle body 11 at a total of three portions, so that the slide door 13 can be stably opened and closed with respect to the vehicle body 11.

An opening and closing apparatus 20 for driving the slide door 13 so as to open and close the slide door 13 is provided on the side portion of the vehicle body 11 of the vehicle 10. The opening and closing apparatus 20 is provided with a driving apparatus 21, and the driving apparatus 21 is installed in the vehicle body 11, and adjacent to an approximately central portion of the guide rail 14 in the forward and rearward directions.

The opening and closing apparatus 20 is provided with a reversing pulley 22a provided on the vehicle rear side of the guide rail 14, a reversing pulley 22b provided on the vehicle front side of the guide rail 14, an opening side cable 23a pulling the slide door 13 toward a fully-opened position, and a closing side cable 23b pulling the slide door 13 toward a fully-closed position. Each of the cables 23a and 23b constitutes a wire member in the present invention. One end sides of the cables 23a and 23b are extended to the driving apparatus 21, while the other ends of the cables 23a and 23b are connected to the roller assembly 15 (the slide door 13) from the vehicle rear side and the vehicle front side via the reversing pulleys 22a and 22b.

Here, by driving and rotating the driving apparatus 21 in a forward direction, the opening side cable 23a is pulled so as to open the slide door 13. On the other hand, by driving and rotating the driving apparatus 21 in a reverse direction, the closing side cable 23b is pulled so as to close the slide door 13. Incidentally, portions of the cables 23a and 23b, which is located outside of the vehicle body 11, are concealed in a guide groove (not shown) in the guide rail 14, so that the cables 23a and 23b are not exposed on the outside, and the cables 23a and 23b are protected from rain water, dusts, or the like while the vehicle 10 is enhanced in outer appearance.

Flexible outer casings 24a and 24b covering outer circumferences of the cables 23a and 23b are provided between the reversing pulleys 22a and 22b and the driving apparatus 21, respectively. Grease (not shown) having a predetermined viscosity are applied to each inside of the outer casings 24a and 24b, so that the cables 23a and 23b are protected and sliding performance of the cables 23a and 23b to the outer casings 24a and 24b are improved.

As shown in FIGS. 3 and. 4, the driving apparatus 21 is provided with a drum unit 30 and a motor unit 40, and they are coupled to each other so as to be capable of transmitting power to each other. Incidentally, in FIG. 4, a drum case 31 and a case cover 32 are not illustrated for easy understanding of an internal structure of the drum unit 30.

The drum unit 30 is provided with the drum case 31 fixed to the vehicle body 11. The drum case 31 is formed into a flat shape having a bottom by performing injection molding of resin material such as molten plastic, and provided with: a motor unit mounting portion 31a formed into an approximately cylindrical shape; and a main body portion 31b formed into an approximately rectangular parallelepiped shape. The motor unit 40 is attached to an opening side portion of the motor unit mounting portion 31a, and an opening side portion of the main body portion 31b is closed by the case cover 32 made of resin material such as plastic.

A drum 33 shown in FIGS. 4 to 6 is rotatably accommodated in the motor unit mounting portion 31a. Therefore, the drum 33 is rotatably provided in the vehicle body 11 via the drum case 31. As shown in FIGS. 4 and 6, an approximately-cylindrical winding portion 33a is integrally provided on the front surface side of the drum 33, and cable grooves 33b guiding windings of the cables 23a and 23b are formed on the winding portion 33a so as to be parallel with each other in an axial direction of the winding portion 33a. One ends of the cables 23a and 23b are wound on the cable grooves 33b by a plurality of times, and the opening side cable 23a is wound on the winding portion 33a by rotationally driving the drum 33 in the forward direction, while the closing side cable 23b is wound on the winding portion 33a by rotationally driving the drum 33 in the reverse direction.

As shown in FIGS. 5 and 6, three engaging recesses 33c are formed on the rear face of the drum 33 along a circumferential direction of the drum 33. Each of the engaging recesses 33c has a predetermined width toward the circumferential direction of the drum 33, and are provided at regular intervals (intervals of 120 degrees), and sandwiching segments 51 of a damper member 50 shown in FIG. 6 and torque transmitting portions 43a of a torque transmitting plate 43 provided on the motor unit 40 are inserted into the respective engaging recesses 33c.

As shown in FIGS. 3 and 5, a pair of sleeves 34a and 34b guiding pulling-in of the cables 23a and 23b into the main body portion 31b are attached to portions positioned on the side opposite to the motor unit mounting portion 31a along a longitudinal direction of the main body portion 31b. End portions of the outer casings 24a and 24b are attached to the respective sleeves 34a and 34b.

As shown in FIGS. 4 and 5, a pulley 35 for guiding one ends of the cables 23a and 23b toward the drum 33 and a tensioner mechanism 36 for keeping tensions of the cables 23a and 23b constant to prevent the cables 23a and 23b from loosening are provided in the main body portion 31b. The pulley 35 is provided on the same side of the main body portion 31b as the sleeves 34a and 34b, while the tensioner mechanism 36 is provided on the same side of the main body 31b as the motor unit mounting portion 31a (on the same side as the drum 33).

The tensioner mechanism 36 is provided with a pair of plate-like members 36a and 36b, and one end side (on the same side as the drum 33) of each of the plate-like members 36a and 36b are rotatably coupled to each other via a screw member 36c. The screw member 36c has a function serving as a coupling pin rotatably coupling the one ends of the respective plate-like members 36a and 36b and a function for fixing the tensioner mechanism 36 to the main body portion 31b.

A spring member 36d is provided on one end side of each of the plate-like members 36a and 36b so as to surround the screw member 36c. The spring force of the spring member 36d acts in a direction of bringing the other end side (on the same side as the pulley 35) of each of the plate-like members 36a and 36b close to each other. Therefore, the respective cables 23a and 23b are bowed, thereby cancelling loosening of each of the cables 23a and 23b to keep tensions of the cables 23a and 23b constant.

A pair of rollers 36e and 36f are provided on the other ends of the plate-like members 36a and 36b, respectively. The rollers 36e and 36f come in contact with the respective cables 23a and 23b, so that the rollers 36e and 36f rotate according to movements of the respective cables 23a and 23b following rotation of the drum 33 without being resisted substantially.

As shown in FIG. 5, for assembling the drum unit 30, first, the drum 33 having the winding portion 33a on which the respective cables 23a and 23b have been wound by a plurality of times is prepared and the drum case 31 on which the pulley 35 has been mounted is prepared. Thereafter, the drum 33 is assembled to the motor unit mounting portion 31a. Next, the respective cables 23a and 23b are hooked to the pulley 35 so as to intersect with each other on the opposite side to the drum 33 and the respective sleeves 34a and 34b are attached to the main body portion 31b. Next, after inner sides of the rollers 36e and 36f of the tensioner mechanism 36 have been brought into contact with the respective cables 32a and 23b, the tensioner mechanism 36 is mounted to the main body portion 31b by the screw member 36c. Then, the case cover 32 is caused to face the drum case 31 from an opening side of the drum case 31 and three fastening screws S1 are screwed into the drum case 31 as shown by an alternate long and short dash line in FIG. 5, so that assembling of the drum unit 30 is completed.

As shown in FIG. 6, a damper member 50 formed into a predetermined shape from elastic material having flexibility such as rubber is provided between the drum 33 forming the drum unit 30 and the torque transmitting plate 43 forming the motor unit 40. The damper member 50 has six sandwiching segments 51 respectively corresponding to the engaging recesses 33c of the drum 33, and the sandwiching segments 51 are provided on an annular supporting main body 52 at predetermined intervals along a circumferential direction of the supporting main body 52.

Two of the sandwiching segments 51 are inserted into each of the three engaging recesses 33c provided in the drum 33, and the torque transmitting portions 43a of the torque transmitting plate 43 is inserted between a pair of sandwiching segments 51 inserted into the respective engaging recesses 33c. Thus, when the torque transmitting plate 43 of the motor unit 40 is rotated in forward and backward directions, rotation torque is transmitted from the torque transmitting portions 43a to the drum 33 via the sandwiching segments 51 so that the drum 33 is rotated. At this time, an impact due to a sudden rotation-starting action, a sudden rotation-stopping action, or a sudden rotation-reversing action of the torque transmitting plate 43, or the like is reduced by elastic deformations of each sandwiching segment 51, and not transmitted to the slide door 13. That is, noises or the like due to rattling of the slide door 13 according to rotational drive of the motor unit 40 is prevented.

As shown in FIGS. 3, 4, and 7, the motor unit 40 is provided with a motor case 41 and a motor cover 42.

The motor case 41 is formed into a predetermined shape by casting aluminum material or the like, and the motor case 41 has a large-diameter portion 41a and a small-diameter portion 41b. A flat motor 60 serving as an electric motor is accommodated in the large-diameter portion 41a, and a hypocycloid reducer 70 serving as a differential reducer is accommodated in the small-diameter portion 41b.

The large-diameter portion 41a is closed by the motor cover 42 formed into a disk shape by press-forming of a steel plate or the like. On the other hand, the torque transmitting plate 43 is provided in the small-diameter portion 41b of the motor case 41. Three fan-shaped toque transmitting portions 43a is provided to the torque transmitting plate 43 (see FIGS. 4 and 6) along its circumferential direction at regular intervals (intervals of 120 degrees), and each of the torque transmitting portions 43a is sandwiched by two sandwiching segments 51 of the damper member 50. Therefore, after assembling the assembled motor unit 40, the damper member 50 can be hold without dropping out of the torque transmitting plate 43.

The large-diameter portion 41a is integrally provided with a mounting portion 41c for mounting the motor unit 40 to the drum unit 30, and the mounting portion 41c projects in its radially outward direction. As shown in FIG. 4, the mounting portion 41c is provided with a pair of screw holes 41d, and as shown in FIG. 3, a pair of fastening screw S2 is inserted into the respective screw holes 41d. By mounting the small-diameter portion 41b of the motor case 41 to the motor unit mounting portion 31a of the drum unit 30 and screwing the fastening screws S2 into the drum case 31, the motor unit 40 and the drum unit 30 are united to form the driving apparatus 21.

As shown in FIG. 7, the flat motor 60 which rotationally drives the drum 33 is accommodated in the large-diameter portion 41a of the motor case 41. The flat motor 60 is provided coaxially with the drum 33, and an axial size thereof is smaller than a diametrical size thereof. As the flat motor 60, a blushless DC motor of an inner rotor type is adopted, and the flat motor 60 is provided with a stator 62 where a plurality of coil bobbins 61 (only two coil bobbins are shown in FIG. 7) is arranged in an annular shape and a rotor 63 rotatably arranged on a diametrically-inner side of the stator 62 via a predetermined clearance (air gap). A coil 61*a* is wound on each of the coil bobbins 61 forming the stator 62 by a predetermined number of times according to concentrating winding, while a plurality of permanent magnets 64 are provided on the rotor 63 along a circumferential direction of the rotor 63. The permanent magnets 64 are arranged so that they form "N" poles and "S" poles alternately along the circumferential direction of the rotor 63.

The rotor 63 is rotated about an axial center C1 by supplying driving current to the coils 61*a* of the stator 62 according to predetermined control logic. A rotor shaft member 65 serving as an input member is fixed to a rotation center (axial center C1) of the rotor 63, and the rotor shaft member 65 is rotated with the same rotation number as the rotor (electric motor) 63. The rotor shaft member 65 is provided with a shaft main body 65*a*, a first shaft portion 65*b*, and a second shaft portion 65*c*, and the first shaft portion 65*b* is provided integrally with the rotation center (axial center C1) and fixed to the rotor 63. On the other hand, the second shaft portion 65*c* is provided at a position offset (deviated) from the rotation center of the shaft main body 65*a* in a radial direction by a predetermined amount, that is, so as to have its center at an axial center C2.

The shaft main body 65*a* of the rotor shaft member 65 is rotatably provided in the motor case 41 via a first ball bearing (radial bearing) 66. Therefore, the rotor 63 is rotatably supported by the motor case 41 via the rotor shaft member 65, and the rotor shaft member 65 is rotated according to rotational driving of the rotor 63.

The hypocycloid reducer 70 is accommodated in the small-diameter portion 41*b* of the motor case 41 between the drum 33 and the flat motor 60. The hypocycloid reducer 70 is for speed-reducing rotation of the flat motor 60 to output the rotation to the drum 33, and it is provided with an outer gear 71 and an inner gear 72. An axial size (thickness size) of the hypocycloid reducer 70 is set to approximately a thickness size of the outer gear 71. Therefore, the hypocycloid reducer 70 is made flat, which realizes thinning (space saving) of the motor unit 40.

The outer gear 71 is formed into a ring shape having an outer-diametrical size approximately equal to an inner-diametrical size of the small-diameter portion 41*b*, and a teeth portion 71*a* composed of a spur gear is formed on a diametrically-inner side (an inner circumference) of the outer gear 71. The outer gear 71 is disposed on the side of the flat motor 60 along an axial direction of the small-diameter portion 41*b*, and is fixed to the small-diameter portion 41*b* of the motor case 41.

The inner gear 72 is provided in a diametrically-inner side of the outer gear 71, and an outer-diametrical size thereof is set to be smaller than an inner-diametrical size of the outer gear 71. A teeth portion 72*a* composed of a spur gear is formed on a diametrically-outer side (an outer circumference) of the inner gear 72, and the teeth portion 72*a* of the inner gear 72 is caused to mesh with the teeth portion 71*a* of the outer gear 71. That is, the inner gear 72 is rolled inside the outer gear 71 without slipping.

A rotation center of the inner gear 72 is rotatably provided on the same side of the hypocycloid reducer 70 as the flat motor 60 at the second shaft portion 65*c* of the rotor shaft member 65 via a second ball bearing (radial bearing) 73. Therefore, the second shaft portion 65*c* having the axial center C2 offset from the axial center C1 is rotated on a diametrically-inner side of the outer gear 71, and according to the rotation of the second shaft portion 65C, the inner gear 72 rolls on the diametrically-inner side of the outer gear 71 while rotating about the second ball bearing 73.

A total of seven sliding contact holes 72*b* are provided between the rotation center and the teeth portion 72*a* along the radial direction of the inner gear 72 at regular intervals along the circumferential direction of the inner gear 72. Output pins 74*a* fixed to an output rotation body 74 respectively come in sliding contact with the diametrically-inner sides of the sliding contact holes 72*b* via sliding cylinder bodies 74*b* according to rolling of the inner gear 72 relative to the outer gear 71.

The output rotation body 74 is rotatably provided between the hypocycloid reducer 70 in the small-diameter portion 41*b* of the motor case 41 and the torque transmitting plate 43, that is, on the same side of the hypocycloid reducer 70 as the drum 33. A diametrical outside of the output rotation body 74 is rotatably supported by the small-diameter portion 41*b* via a third ball bearing (radial bearing) 75, while a diametrical inside of the output rotation body 74 is rotatably supported by an eccentric segment 77 attached to the second shaft portion 65*c* via a fourth ball bearing (radial bearing) 76. The eccentric segment 77 is attached to the second shaft portion 65*c* at a position offset from the rotation center (axial center C1) of the eccentric segment 77, so that the eccentric segment 77 is rotated about the axial center C1 according to rotation of the second shaft portion 65*c*.

The output rotation body 74 is provided with a total of seven output pins 74*a* corresponding to the respective sliding contact holes 72*b* of the inner gear 72. The output pins 74*a* project toward the inner gear 72, and their projecting portions extend in the respective sliding contact holes 72*b*. The projecting portions of the output pins 74*a* are respectively covered with cylindrical sliding cylinder bodies 74*b* made of resin material such as plastic, so that sliding contact resistance of the output pins 74*a* to the corresponding sliding contact holes 72*b* is reduced, thereby improving power transmission efficiency.

The torque transmitting plate 43 is fixed to the output rotation body 74 via a plurality of (for example, six) fixing pins 74*c*, so that the output rotation body 74 and the torque transmitting plate 43 are integrated with each other to be capable of rotating in an integral manner. Here, the output rotation body 74 and the torque transmitting plate 43 constitute an output member in the present invention, and they are configured to output the rotation of the flat motor 60 which has been speed-reduced by the hypocycloid reducer 70 to the drum 33.

Next, an operation of the driving apparatus 21 formed in the above manner will be described in detail with reference to the drawings. Incidentally, FIG. 8 schematically shows constituent members forming the hypocycloid reducer 70 in order to clarify the operation of the hypocycloid reducer 70.

The rotor 63 of the flat motor 60 shown in FIG. 7 is rotationally driven in one direction according to an operator's opening operation of an opening and closing switch (not shown) provided in a vehicle interior of the vehicle 10 or the like. According to the operation, the rotor shaft member 65 is rotated according to the rotation of the rotor 63 as shown by a solid line arrow (IN) in FIG. 8A. Therefore, the second shaft portion 65*c* of the rotor shaft member 65 is rotated within the outer gear 71 and the inner gear 72 is rolled within the outer gear 71 without slipping in a meshing state of the teeth portion 72a of the inner gear 72 with the teeth portion 71a of the outer gear 71.

According to the rolling of the inner gear 72, the respective output pins 74a are brought into sliding contact with insides of the respective sliding contact holes 72b provided in the inner gear 72 via the respective sliding cylinder bodies 74b. At this time, the respective output pins 74a are gradually moved in a direction opposed to the rotation direction of the rotor 63 because the respective teeth portion 71a and 72a are put in a meshing with each other and the respective output pins 74a are brought in sliding contact with the insides of the respective sliding contact holes 72b. Therefore, the output rotation body 74 is speed-reduced and made torque thereof high to be rotated in a forward direction (a broken line arrow (OUT) direction in FIG. 8A), so that the drum 33 is rotated in the forward direction via the torque transmitting plate 43 and the damper member 50. According to the rotational driving of the drum 33 in the forward direction, the opening side cable 23a is pulled so that the slide door 13 is moved toward the fully-opened position (see FIG. 2).

Here, for example, when the number of teeth Z1 of the outer gear 71 is 91 (Z1=91) and the number of teeth Z2 of the inner gear 72 is 90 (Z2=90), the reduction ratio of the hypocycloid reducer 70 becomes 1/90 from the relational equation (Z1−Z2)/Z2. Thus, the hypocycloid reducer 70 can obtain a relatively high reduction ratio with one stage. Therefore, in this embodiment, while flattening (thinning) of the driving apparatus 21 is realized by simplifying the configuration of the differential reducer, the driving apparatus 21 is configured as one of a high output type, so that the driving apparatus 21 is made suitable for opening and closing drive of the slide door 13 having a relatively heavy weight.

Incidentally, when the slide door 13 is moved toward the fully-closed position, the opening and closing switch is operated for closing inversely with the above. Therefore, the rotor 63 of the flat motor 60 is rotated in the other direction, so that the drum 33 is rotated in the reverse direction, the closing side cable 23b is pulled, and the slide door 13 is moved toward the fully-closed position.

In order to operate the slide door 13 for opening and closing manually, first, the opening and closing switch is put in an OFF state. Then, the slide door 13 can be operated for opening or closing manually according to movement of the slide door 13 performed by the operator in the front direction or the rear direction of the vehicle. At this time, by moving the slide door 13, the respective cables 23a and 23b rotate the drum 33, but the rotation shaft of the drum 33, the rotation shaft of the rotor 63, the rotation shalt of the rotor shaft member (input member) 65, and the rotation shaft of the output rotation body (output member) 74 are arranged coaxially, respectively. Therefore, by rotating the drum 33 easily, the slide door 13 can be moved substantially without resistance, which is different from the conventional reducer composed of a worm and a worm wheel. That is, by operating the slide door 13 for opening or closing manually, the hypocycloid reducer 70 and the flat motor 60 can be rotated (driven) easily in the direction reverse to the automatic opening and closing operation.

Here, the hypocycloid reducer 70 can adopt an aspect shown in FIG. 8B. Incidentally, portions having functions similar to those of the hypocycloid reducer 70 shown in FIG. 8A are attached with same reference numerals used in the hypocycloid reducer 70 and detailed explanations thereof are omitted. A hypocycloid reducer 80 shown in FIG. 8B is different from the hypocycloid reducer 70 in such a point that the output pins 74a are integrally provided on the motor case 41, the outer gear 71 and the output rotation body 74 are integrated with each other, and the outer gear 71 is rotatably provided relative to the motor case 41 via a radial bearing RB in the hypocycloid reducer 80. Even in the hypocycloid reducer 80 thus formed, while flattening (thinning) of the driving apparatus 21 is realized by simplifying the configuration of the differential reducer, the driving apparatus 21 is configured as one of a high output type, so that the driving apparatus 21 is made suitable for opening and closing drive of the slide door 13 having a relatively heavy weight approximately in the same manner as the hypocycloid reducer 70 described above.

As described in detail, according to the driving apparatus 21 according to the first embodiment, the hypocycloid reducer 70 which speed-reduces rotation of the flat motor 60 to output the same to the drum 33 is provided between the drum 33 and the flat motor 60, the rotor shaft member 65 which is rotated by the flat motor 60 at the same number of rotations as that of the flat motor 60 is provided coaxially with the drum 33 on the side of the hypocycloid reducer 70 facing the flat motor 60, and the output rotation body 74 (torque transmitting plate 43) which outputs speed-reduced rotation of the flat motor 60 to the drum 33 is provided coaxially with the drum 33 on the side of the hypocycloid reducer 70 facing the drum 33.

Therefore, the rotor shaft member 65 and the output rotation body 74 can be provided coaxially with the drum 33, and turning force can be transmitted in both directions from the rotor shalt member 65 to the output rotation body 74 and from the output rotation body 74 to the rotor shaft member 65. Therefore, the electromagnetic clutch required in the conventional driving apparatus can be made unnecessary, so that size reduction and weight reduction of the driving apparatus can be achieved and mountability of the driving apparatus to a vehicle is improved. Furthermore, since the electromagnetic clutch can be eliminated, simplification of wirings or control logic can be achieved so that large cost reduction of the driving apparatus can be achieved.

According to the driving apparatus 21 according to the first embodiment, since the hypocycloid reducer 70 is provided with the outer gear 71 having the teeth portion 71a on its inner circumference and the inner gear 72 having the teeth portion 72a on its outer circumference and the inner gear 72 rolls within the outer gear 71 according to meshing of the respective teeth portions 71a and 72a with each other, the driving apparatus 21 can be constituted by two parts of the outer gear 71 and the inner gear 72, so that high efficiency of power transmission can be achieved. Furthermore, since the axial size of the hypocycloid reducer 70 can be limited in the thickness size of the outer gear 71, the thickness size of the driving apparatus 21 is suppressed so that further size reduction can be achieved.

According to the driving apparatus 21 according to the first embodiment, the drum unit 30 is formed by housing the drum 33 in the drum case 31, the motor unit 40 is formed by housing the flat motor 60 and the hypocycloid reducer 70 in the motor case 41, and the drum unit 30 and the motor unit 40 are coupled to each other such that power can be transmitted between the both. Therefore, for example, various vehicles (where weights of slide doors are different) can be accommodated by preparing a plurality of motor units 40 having different specifications (a reduction ratio of the hypocycloid reducer 70 or a rated output of the flat motor 60) from one another and performing replacement of only the motor unit 40 by a corresponding motor unit of the prepared motor units. Furthermore, since the drum unit 30 and the motor unit 40 can be detached from the vehicle body, the respective units 30 and 40 can be maintained easily, respectively.

According to the driving apparatus 21 according to the first embodiment, since the elastically-deformable damper member 50 is provided between the drum 33 and the torque transmitting plate 43 so that turning force of the torque transmitting plate 43 is transmitted to the drum 33 via the damper member 50, rattling between the torque transmitting plate 43 and the drum 33 is suppressed, so that occurrence of noises can be suppressed. Furthermore, since shalt deviation between the torque transmitting plate 43 and the drum 33 can be absorbed by elastic deformation of the damper member 50, for example, even if the drum 33 is inclined during windings of the respective cables 23a and 23b, transmission of turning force can be performed smoothly while rattling between the torque transmitting plate 43 and the drum 33 is suppressed.

According to the driving apparatus 21 according to the first embodiment, since the flat motor 60 whose axial size is made smaller than the diametrical size thereof is used as the electric motor and the flat motor 60 is provided coaxially with the drum 33, increase of the size (thickness size) of the driving apparatus 21 to the axial direction of the drum 33 can be suppressed. Therefore, thinning (flattening) of the driving apparatus 21 is realized so that mountability of the driving apparatus 21 to the vehicle 10 can be further improved. Furthermore since the drum 33, the hypocycloid reducer 70, and the flat motor 60 are provided so as to be axially aligned with each other, turning force can be transmitted from the rotor shaft member 65 to the torque transmitting plate 43 and the torque transmitting plate 43 to the rotor shalt member 65 efficiently.

Next, the second embodiment of the present invention will be described in detail with reference to the drawings. Incidentally, portions having functions the same as those of the first embodiment are denoted by the same reference numbers as those of the first embodiment and the detail description on those portions are omitted here.

Figure 9:
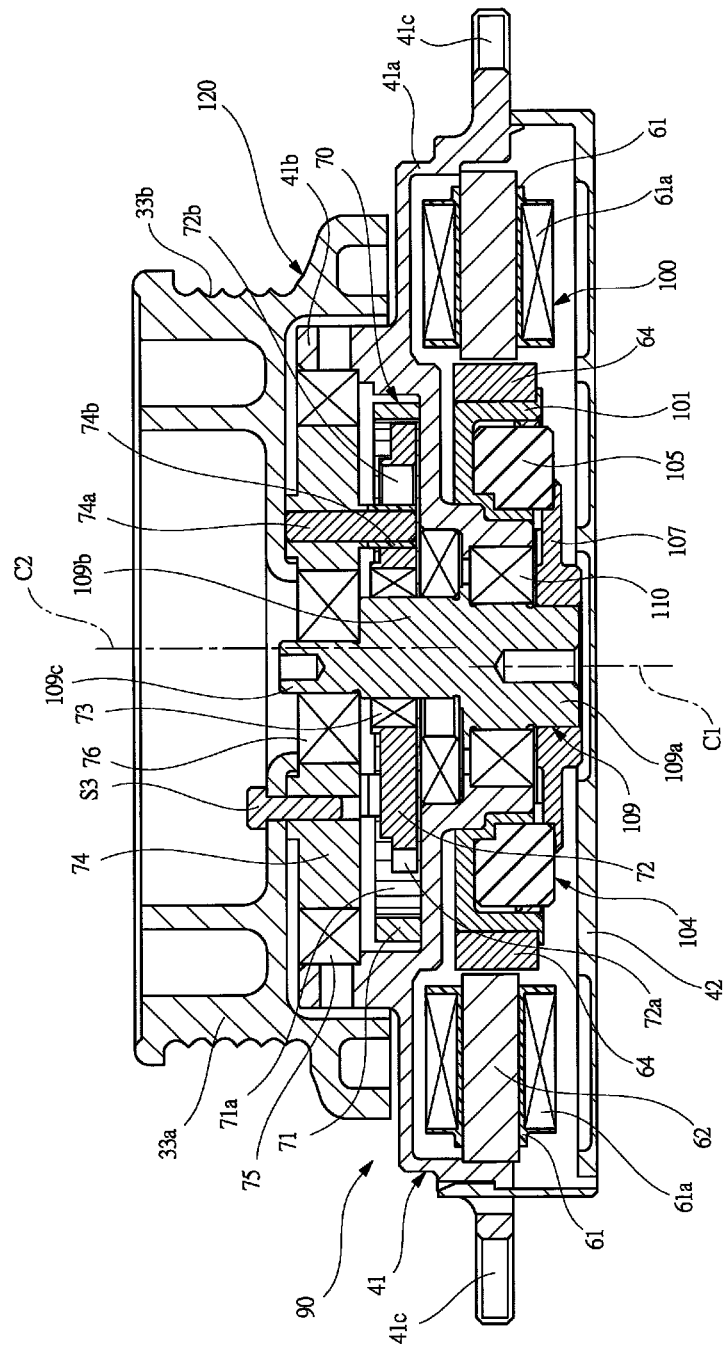
FIG. 9 is a cross sectional view showing a detailed structure of a motor unit according to the second embodiment.

FIG. 9 is a cross sectional view showing a detailed structure of a motor unit according to the second embodiment, and FIG. 10 is an exploded perspective view for explaining a connecting structure of a rotor, a damper member, and an input member in the motor unit shown in FIG. 9.

As shown in FIG. 9, the second embodiment is different from the first embodiment in configurations of a motor unit 90 and a drum 120. Specifically, in the first embodiment, as shown in FIG. 6, the damper member 50 is provided between the torque transmitting plate (output member) 43 and the drum 33, while a damper member 104 is provided between a rotor 101 and a torque receiving member 107, and the drum 120 is directly fixed to the output rotation body 74 via a fastening screw S3 in the second embodiment.

A flat motor 100 serving as the electric motor rotationally driving the drum 120 is accommodated in the large diameter portion 41a of the motor case 41. The flat motor 100 is provided with a rotor 101 and the rotor 101 is provided rotatably relative to the coil bobbins 61 fixed in the motor case 41. As shown in FIG. 10, the rotor 101 is provided with a rotor bottom 102, and a total of four first fitting holes 103 are provided in the rotor bottom 102 along a circumferential direction of the rotor 101 (only three are shown in FIG. 10). The respective first fitting holes 103 are provided along the circumferential direction of the rotor 101 at regular intervals (intervals of 90 degrees), and they are each formed into an approximately-arc shape. Respective sandwiching segments 105 of the damper member 104 are inserted and fitted in the respective first fitting holes 103, as shown by a broken line arrow I in FIG. 10.

The damper member 104 is formed into a predetermined shape from elastic material having flexibility such as rubber like the damper member 50 according to the first embodiment (see FIG. 6), and it is reduced in size and in weight as compared with the damper member 50 of the first embodiment. The damper member 104 is provided with four sandwiching segments 105 corresponding to the first fitting holes 103 of the rotor 101, respectively, and the respective sandwiching segments 105 are provided along the circumferential direction of the damper member 104 at regular intervals (intervals of 90 degrees) via respective supporting main bodies 106. The respective sandwiching segments 105 are formed into an approximately arc shape like the respective first fitting holes 103, so that they can be fitted into the respective first fitting holes 103, respectively.

The torque receiving member 107 is formed into an approximately disk shape, and a total of four second fitting holes 108 (only three are shown in FIG. 10) are provided in the torque receiving member 107 along a circumferential direction of the torque receiving member 107. The respective second fitting holes 108 are provided in the circumferential direction of the torque receiving member 107 at regular intervals (intervals of 90 degrees), and they are formed into an approximately arc shape like the respective sandwiching segments 105, respectively. The sandwiching segments 105 of the damper member 104 are inserted and fitted in the respective second fitting holes 108, as shown by a broken line arrow II in FIG. 10. Furthermore, a first shalt portion 109a forming a rotor shaft member 109 serving as the input member is fixed at a rotation center of the torque receiving member 107. That is, the torque receiving member 107 is provided so as to be rotatable integrally with the rotor shalt member 109, and the torque receiving member 107 also constitutes the input member in the present invention.

Thus, by assembling the damper member 104 between the rotor 101 and the torque receiving member 107, turning force of the rotor 101 (the torque receiving member 107) is transmitted to the torque receiving member 107 (rotor 101) via the damper member 104.

The rotor shaft member 109 is provided with a first shaft portion 109a, a second shaft portion 109b, and a third shalt portion 109c. As shown in FIG. 9, the first shalt portion 109a is rotatably supported by the motor case 41 via a first ball bearing (radial bearing) 110 and it is rotated about a shaft center C1. That is, the rotor 101 is rotated about the shaft center C1 via the rotor shalt member 109, the torque receiving member 107, and the damper member 104.

The second shaft portion 109b is provided so as to have its center at a position offset (deviated) from a rotation center (shaft center C1) of the first shalt portion 109a by a predetermined amount, that is, at a position of an axial center C2 deviated from the shaft center C1. The inner gear 72 is rotatably provided on the second shaft portion 109b via the second ball bearing (radial bearing) 73, so that the second shaft member 109b having the axial center C2 rotates on an diametrically-inner side of the outer gear 71, and the inner gear 72 rolls on a diametrically-inner side of the outer gear 71 while the inner gear 72 is rotating about the second ball bearing 73 according to the rotation of the second shaft portion 109b.

The third shaft portion 109c rotates around the shalt center C1 like the first shalt portion 109a, and the output rotation body 74 is rotatably provided on the third shalt portion 109c via the fourth ball bearing (radial bearing) 76. Therefore, the output rotation body 74 rotates around the shaft center C1. Furthermore, a drum 120 is fixed on the side of the output rotation body 74 opposite to the hypocycloid reducer 70 by screw-joining of a plurality of fastening screws S3 (only one is shown in FIG. 9).

Even the second embodiment thus formed can achieve operation and effect similar to those of the first embodiment except for operation and effect obtained from a difference of a position at which the damper member is provided (on the side of the hypocycloid reducer facing the drum or facing the flat motor). In addition to this, in the second embodiment, since the elastically-deformable damper member 104 is provided between the rotor 101 and the torque receiving member 107 and turning force of the rotor 101 is transmitted to the torque receiving member 107 via the damper member 104, rattling between the rotor 101 and the torque receiving member 107 is suppressed so that occurrence of noises can be suppressed. Furthermore, since an operation force for the slide door 13 is transmitted from the drum 120 to the rotor 101 via the hypocycloid reducer 70, the operation force is speed-increased in the hypocycloid reducer 70 to be changed to small force and the small force is loaded to the damper member 104, so that an impact occurring at a manual operation of the slide door 13 or the like can be received by the damper member 104 smaller than that of the first embodiment efficiently, which results in further size reduction of the driving apparatus.

The present invention is not limited to the above-mentioned embodiments, and it goes without saying that various modifications are possible without departing from the gist of the present invention. For example, in each of the above-mentioned embodiments, the example where the driving apparatus 21 is arranged inside the vehicle body 11 and the respective cables 23a and 23b are connected to the slide door 13 has been shown, but the present invention is not limited to this example, and the present invention can be applied to a structure where the driving apparatus 21 is arranged inside the slide door 13 and the respective cables 23a and 23b are fixed to both end portions of the guide rail 14 via the region of the roller assembly 15 in the slide door 13.

Furthermore, in each of the above-mentioned embodiments, the flat motors 60 and 100 as an electric motor is exemplified by a brushless DC motor. However, the present invention is not limited to this, and for example, a motor with brush may be used.

Furthermore, in each of the above-mentioned embodiments, the differential reducer is exemplified by a hypocycloid reducer 70 and 80. However, the present invention is not limited to this, and for example, a differential reducer composed of a planetary gear mechanism in which an output member and an input member can be axially aligned with each other may be used.

Furthermore, in each of the above-mentioned embodiments, two cables including an opening side cable 23a and a closing side cable 23b are used. However, the present invention is not limited to this, and for example, an intermediate portion of one cable is wound on the drum 33 or 120 by a plurality of times, and both end portions of this cable may be connected to the slide door 13.

A side portion of a vehicle body of a vehicle is provided with a driving apparatus for an opening and closing body for vehicle, and is used to drive a slide door for opening and closing an opening portion formed at the side portion of the vehicle body.

While the present invention has been illustrated and described with respect to a particular embodiment thereof, it should be appreciated by those of ordinary skill in the art that various modifications to this invention may be made without departing from the spirit and scope of the present.

What is claimed is:

1. A driving apparatus for an opening and closing body for vehicle, for driving an opening and closing body provided to a vehicle body to open and close the opening and closing body, the driving apparatus comprising:
    a drum rotatably provided to one of the vehicle body and the opening and closing body,
    a wire member whose one end is wound on the drum, and whose the other end is connected to the other of the vehicle body and the opening and closing body;
    an electric motor for driving the drum so as to rotate the drum, the electric motor being composed of an inner rotor type brushless motor;
    a differential reducer provided between the drum and the electric motor, and adapted to reduce the rotation of the electric motor to output the speed-reduced rotation to the drum;
    an input member axially aligned with the drum, and provided on the same side of the differential reducer as the electric motor, the input member having one end fixed to a rotor of the electric motor, and being rotated by the electric motor with the same rotation number as the electric motor; and
    an output member axially aligned with the drum, and provided on the same side of the differential reducer as the drum, the output member outputting the speed-reduced rotation to the drum;
    wherein the input member is rotatably provided in a motor case via a first ball bearing.

2. The driving apparatus for the opening and closing body for vehicle according to claim 1, wherein the differential reducer is a hypocycloid reducer which comprises an outer gear having an inner circumference having a teeth portion, and an inner gear having an outer circumference having a teeth portion, wherein the inner gear rolls within the outer gear while their teeth portions are held in meshing engagement with each other.

3. The driving apparatus for the opening and closing body for vehicle according to claim 2, wherein the input member is provided with:
    a first shaft portion fixed to the rotor;
    a shaft main body rotatably provided in the motor case 41 via a first ball bearing; and
    a second shaft portion provided at a position deviated from the rotation center of the shaft main body in a radial direction by a predetermined amount.

4. The driving apparatus for the opening and closing body for vehicle according to claim 1, wherein the driving apparatus has a drum unit formed by housing the drum in a drum case, and a motor unit formed by housing the electric motor and the differential reducer in the motor case, and the drum unit and the motor unit are coupled to each other so that power is transmitted between the drum unit and the motor unit.

5. The driving apparatus for the opening and closing body for vehicle according to claim 1, wherein an elastically-deformable damper member is provided between the drum and the output member, so that turning force of the output member is transmitted to the drum via the damper member.

6. The driving apparatus for the opening and closing body for vehicle according to claim 1, wherein an elastically-deformable damper member is provided between the rotor of the electric motor and the input member, so that turning force of the rotor is transmitted to the input member via the damper member.

7. The driving apparatus for the opening and closing body for vehicle according to claim 1, wherein the electric motor is composed of a flat motor, wherein an axial size thereof is smaller than a diametrical size thereof, and the flat motor is axially aligned with the drum.

8. The driving apparatus for the opening and closing body for vehicle according to claim 1, wherein a tensioner mechanism for preventing cables from loosening are provided in a drum case.

9. The driving apparatus for the opening and closing body for vehicle according to claim 8, wherein the tensioner mechanism is provided with a pair of plate-like members, one ends of the plate-like members are pivotably incorporated in the drum case by a screw member, a spring member is provided to said one ends of the plate-like members, and a pair of rollers are provided to the other ends of the plate-like members so as to come in contact with the respective cables.

10. A driving apparatus for an opening and closing body for vehicle, for driving an opening and closing body provided to a vehicle body to open and close the opening and closing body, the driving apparatus comprising:
   a drum rotatably provided to one of the vehicle body and the opening and closing body;
   a wire member whose one end is wound on the drum, and whose the other end is connected to the other of the vehicle body and the opening and closing body;
   an electric motor for driving the drum so as to rotate the drum;
   a differential reducer provided between the drum and the electric motor, and adapted to reduce the rotation of the electric motor to output the speed-reduced rotation to the drum;
   an input member axially aligned with the drum, and provided on the same side of the differential reducer as the electric motor, the input member being rotated by the electric motor with the same rotation number as the electric motor;
   an output member axially aligned with the drum, and provided on the same side of the differential reducer as the drum, the output member outputting the speed-reduced rotation to the drum; and
   an elastically-deformable damper member provided between a rotor of the electric motor and the input member, wherein turning force of the rotor is transmitted to the input member via the damper member.

* * * * *